C. W. ROBINSON.
VARIABLE SPEED MECHANISM FOR GRAIN DRILLS AND THE LIKE.
APPLICATION FILED AUG. 29, 1913.
1,218,807.
Patented Mar. 13, 1917.
2 SHEETS—SHEET 1.
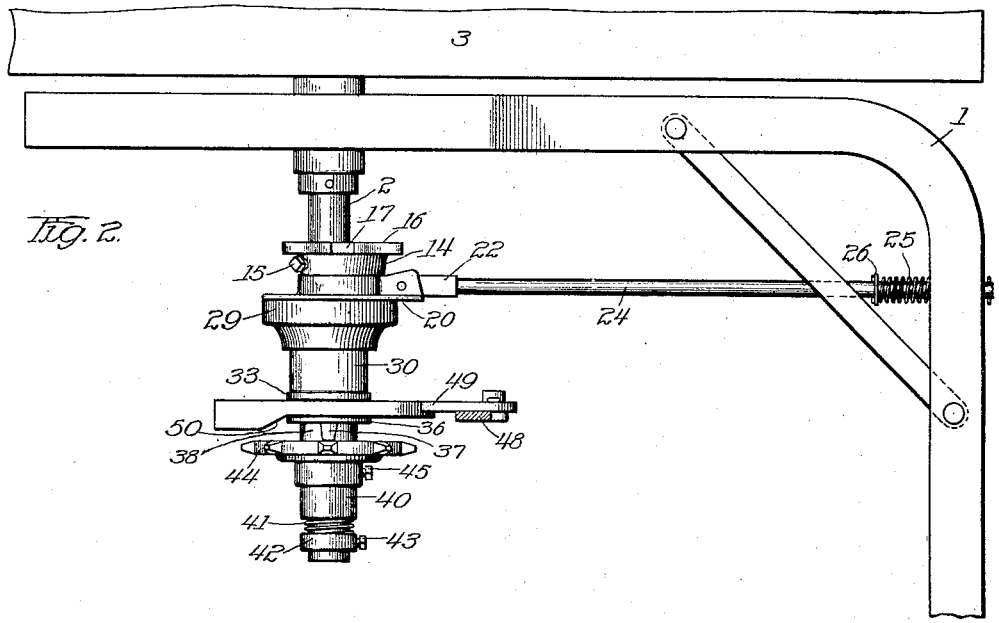
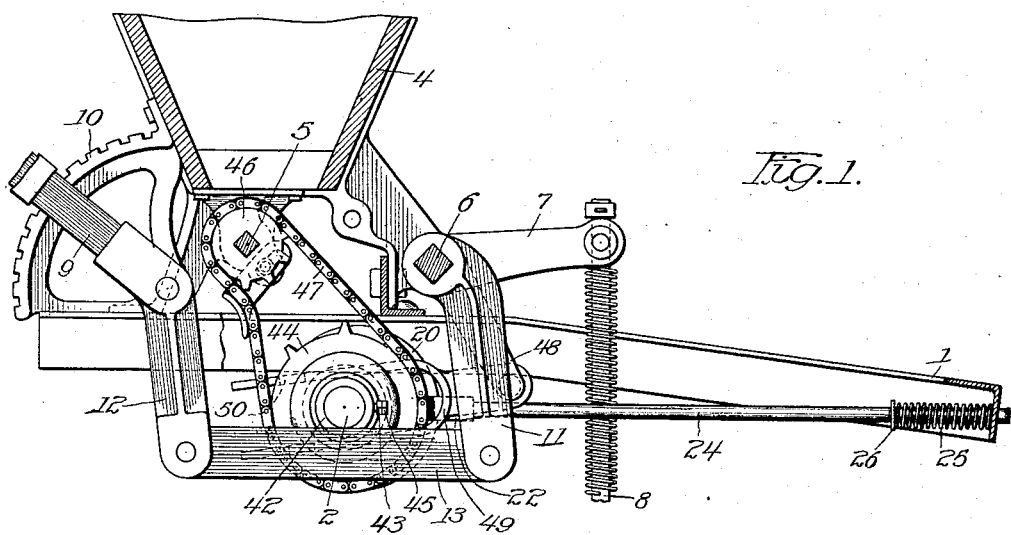

C. W. ROBINSON.
VARIABLE SPEED MECHANISM FOR GRAIN DRILLS AND THE LIKE.
APPLICATION FILED AUG. 29, 1913.
1,218,807.
Patented Mar. 13, 1917.
2 SHEETS—SHEET 2.
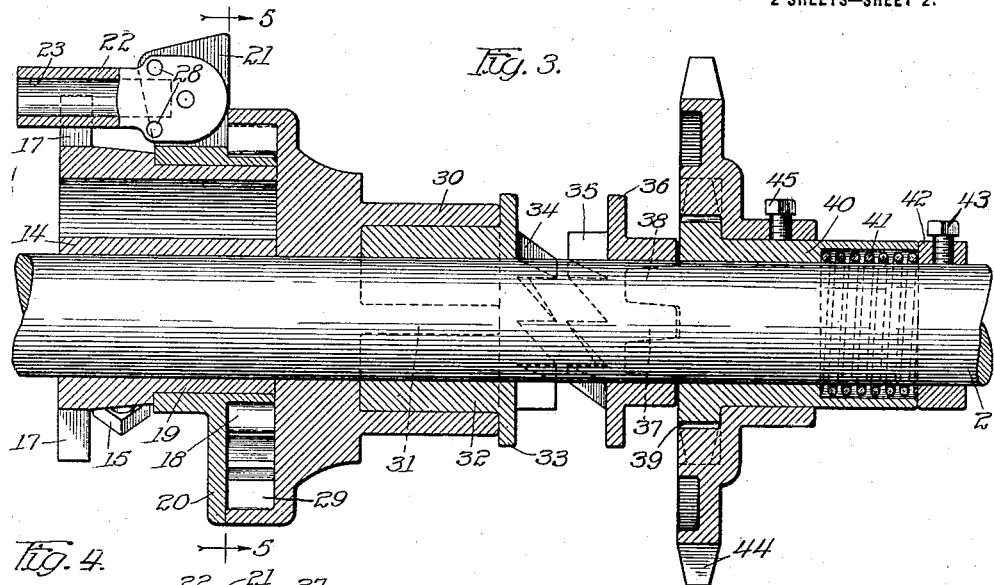
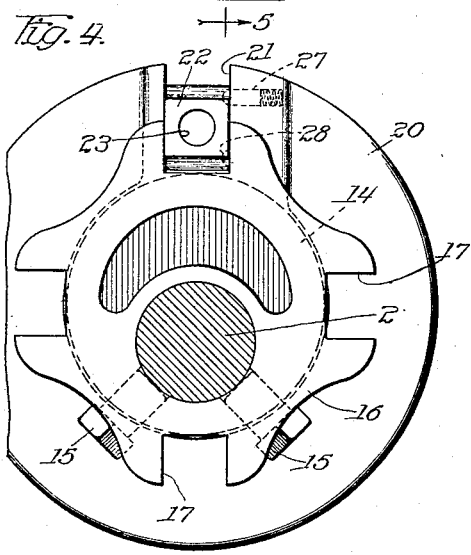
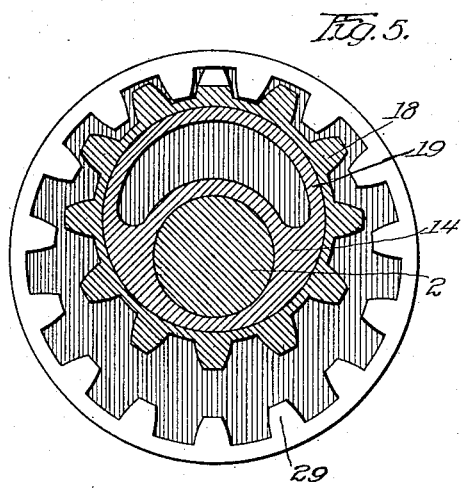
Witnesses:
T. N. Daggett.
E. W. Burgess
Inventor:
Charles W. Robinson.
by Chas. E. Lord
Atty.

UNITED STATES PATENT OFFICE.

CHARLES W. ROBINSON, OF HAMILTON, ONTARIO, CANADA, ASSIGNOR TO INTERNATIONAL HARVESTER CORPORATION, A CORPORATION OF NEW JERSEY.

VARIABLE-SPEED MECHANISM FOR GRAIN-DRILLS AND THE LIKE.

1,218,807. Specification of Letters Patent. Patented Mar. 13, 1917.

Application filed August 29, 1913. Serial No. 787,284.

*To all whom it may concern:*

Be it known that I, CHARLES W. ROBINSON, a citizen of the United States, residing at Hamilton, in the county of Wentworth, Province of Ontario, Dominion of Canada, have invented certain new and useful Improvements in Variable-Speed Mechanisms for Grain-Drills and the like, of which the following is a full, clear, and exact specification.

My invention relates to grain drills, and in particular to speed changing devices in the power transmitting mechanism between the traction and carrying wheels and the seed distributing mechanism, and has for its object to provide a compact, simple and efficient mechanism for accomplishing the desired result. This object is attained by means of mechanism, one embodiment of which is illustrated in the accompanying drawings, in which—

Figure 1 is an end elevation of part of a grain drill having my invention embodied in its construction;

Fig. 2 is a top plan view of part of Fig. 1;

Fig. 3 is a sectional elevation of the speed changing mechanism;

Fig. 4 is an end elevation of an eccentric sleeve forming part of Fig. 3; and

Fig. 5 is a sectional elevation of part of the gear mechanism as embodied in the invention, taken on line 5—5 of Fig. 3.

The same reference characters designate like parts throughout the several views.

1 represents a part of the main frame of a grain drill, 2 a driving axle journaled upon the main frame and having carrying and traction wheels 3 mounted thereon, one wheel only being shown. 4 represents a seed hopper carried by the main frame 1, 5 a feed shaft journaled in the hopper, 6 a rock shaft journaled in bearings carried by the main frame and having lever arms 7 secured thereto that are connected, by means of links 8, with the furrow openers (not shown). 9 represents a hand lever pivotally mounted upon the main frame adjacent a sector rack 10, the lever being provided with any preferred form of detent mechanism that may operatively engage the sector rack for the purpose of retaining the hand lever in any desired position of adjustment.

11 represents a depending arm secured to the rock shaft 6, and connected with a depending arm 12, forming part of the hand lever 9, by means of a link 13, whereby the rock shaft may be turned by the hand lever to lower the grain boots to the ground or raise them therefrom.

The driving axle 2 rotates with the traction wheels, and 14 represents an eccentric sleeve member secured thereto, as by set screws 15, the sleeve being provided with a flange member 16 having a series of radially disposed notches 17 upon its periphery. 18 represents a pinion journaled upon an extended bearing portion 19 of the sleeve 14, and having a flange member 20 provided with a radially arranged pocket 21, in which is pivoted a latch member 22; the latch being provided with a socket 23, that removably receives one end of a securing rod 24, the opposite end of the rod being slidably received by an opening in the main frame of the machine, and 25 represents a compression spring encircling the rod and operative between the main frame and a washer 26 to yieldingly hold the opposite end of the rod in engagement with the socket 23. The latch 22, when released from the rod 24, may be turned laterally toward the flanged end of the eccentric sleeve in a manner to be received by one of the notches 17, and 27 represents a spring-pressed plunger that will enter either of two oppositely disposed depressions 28 in the side of the latch for the purpose of yieldingly holding the latch in either position of adjustment. When the latch is in engagement with the eccentric sleeve 14 the pinion 18 rotates therewith, and when it is in engagement with the rod 24 the eccentric sleeve turns loosely within the pinion, the spring 25 permitting the necessary longitudinal movement of the rod 24 as the eccentric rotates, or there may be a free sliding movement of the rod in the socket 23, the function of the rod 24 being to secure the pinion 18 against rotation. 29 represents an internal gear wheel loosely journaled upon the axle 2 and engaging with the pinion 18, and provided with an axially extended shell portion 30, provided with longitudinally disposed rib members 31 that are received by corresponding slots in a sleeve 32 that is provided with a flanged head 33, having clutch teeth 34 upon its outside face. 35 represents a complemental clutch member having a like flanged head 36, and 37 represents clutch members upon the opposite side of the flange that engage with other clutch members 38 carried by one end of the hub of a sprocket wheel 39 loosely journaled and slidable upon the axle 2, and provided with a sleeve member 40 upon the opposite end of the hub that is provided with an axial bore larger than the axle 2 that receives a compression spring 41 that is operative between a collar 42, secured to the axle 2, as by a set screw 43, to normally force the sprocket wheel and clutch member 35 into engagement with the clutch teeth 34. 44 represents a change speed sprocket wheel that is removably secured to the hub of the sprocket wheel 39, as by a set screw 45, in a manner whereby the wheel may be adjusted longitudinally along the hub of the wheel 39 to permit the driving chain to be placed upon the smaller sprocket wheel 39, the two wheels being mounted coaxially, and 46 a sprocket wheel secured to the shaft 5, that may be connected with either of the first mentioned sprocket wheels as desired, as by means of a sprocket chain 47, and by means of the differential gear mechanism and the sprocket wheels 39 and 44, four different rates of speed may be transmitted to the seed distributing mechanism.

When the grain drill is in operation with the furrow openers in engagement with the soil, the clutch members 34 and 35 are in enagagement, as shown in Fig. 2, and the feed shaft is being rotated; but it is desirable that the feed shaft be disconnected from the power transmitting mechanism when the furrow openers are lifted away from the soil, and for this purpose an arm 48 is secured to the rock shaft 6, and pivotally connected to one end of a clutch shipping bar 49, the opposite end of which is forked in a manner to receive the clutch members 34 and 35 between the fork members, and 50 represents cam portions upon that side of the fork members that engages with the flanged head of the movable clutch member in a manner to disengage the clutch members when the shaft 6 is rocked in a direction to lift the furrow openers and permit them to engage when the shaft is rocked in an opposite direction. The eccentric sleeve 14, the pinion 18, journaled upon the sleeve, the internal gear wheel 29, and locking arms constitute a differential gear mechanism operative to change the speed of the seed distributing mechanism relative to that of the driving axle 2, and I prefer that the pinion 18 have twelve teeth and the internal gear wheel fifteen teeth; and I so proportion the eccentric sleeve 14 that the teeth of the pinion and wheel will mesh properly in operation, and with such gears there will be a speed ratio of five to one; or, in other words, with the pinion 18 held against rotation by means of the rod 24, the wheel 29 will be rotated by the eccentric sleeve at one-fifth the speed of the axle. With the pinion locked in engagement with the eccentric, the internal gear wheel 29 will be rotated at one speed with the axle.

Having illustrated and described one form of my invention, I do not wish to be confined closely to the specific details of construction, as many minor changes may be made without departing from its spirit.

What I claim as my invention, and desire to secure by Letters Patent, is:

1. In combination, a driving shaft, a gear eccentrically mounted thereon, a driving gear rotatable on said shaft and meshing with said eccentric gear, and means for connecting and disconnecting said eccentric gear and shaft.

2. In combination, a driving shaft, an eccentric fixed thereto, a gear rotatable with respect to said eccentric, a gear rotatable on said shaft and meshing with said eccentric gear, and means for controlling the driving relation of said gears.

3. In combination, a driving shaft, an eccentric fixed thereto, a gear carried on said eccentric and rotatable with respect thereto, a gear rotatable on said shaft and meshing with said eccentric gear, and means for connecting said eccentric gear and eccentric.

4. In combination, a driving shaft, an eccentric fixed thereto, a gear rotatably mounted on said eccentric, a gear rotatable on said shaft meshing with said eccentric gear, and means for connecting said eccentric gear to said eccentric or holding the same against rotation thereon.

5. In a grain drill, a drive shaft, a feed shaft, operative connections between the same including a driving gear for the feed shaft carried on the drive shaft, a single planet gear for operating said driving gear, and means for connecting and disconnecting said planet gear and drive shaft to change the speed of the driving gear.

6. In a grain drill, a drive shaft, a feed shaft, operative connections between the same including an internal gear on said drive shaft for operating the feed shaft, an eccentric gear for driving said internal gear at a speed variable with respect to that of the drive shaft, and means for connecting and disconnecting said gear and said driving shaft.

7. In a grain drill, a drive shaft, a feed shaft, a chain driving device connecting the two shafts, said driving device including an internal gear and an eccentric gear capable of imparting a variable speed to said feed shaft, and means for positively connecting said eccentric gear and shaft.

8. In combination, a driving shaft, an eccentric carried on said shaft, a gear journaled on said eccentric, and an angularly movable latch member carried by said gear and movable into locking engagement with said eccentric.

9. In combination, a driving shaft, an eccentric fixed thereto having a plurality of notches in its periphery and an axially extending sleeve portion, a gear journaled on said sleeve portion, and a latch member pivoted on said gear and movable into engagement with the notches in said eccentric.

10. In combination, a driving shaft, an eccentric carried thereon, a driving gear carried on said shaft, a coöperating gear carried on said eccentric, and a single means carried by said last mentioned gear whereby the latter may be locked to said eccentric or held against rotative movement with respect thereto.

11. In combination, a frame, a driving shaft journaled thereon, an eccentric carried on said shaft, a gear journaled on said eccentric, a latching member carried by said gear and movable into engagement with said eccentric and into a radially extending position, and means coöperating with said frame engageable with said latch in its last mentioned position to hold the gear against rotation.

12. In combination, a frame, a driving shaft journaled thereon, an eccentric carried on said shaft, a gear journaled on said eccentric, a latching member carried by said gear and movable into engagement with said eccentric and into a radially extending position, and resiliently supported means carried by said frame and engageable with said latch when in its last mentioned position to hold the gear against rotation.

13. In combination, a frame, a driving shaft journaled thereon, an eccentric carried on said shaft, a gear journaled on said eccentric, a latching member carried by said gear and movable into engagement with said eccentric and into a radially extending position, and a resiliently mounted rod carried on said frame engageable with said latch when in its last mentioned position.

14. In combination, a frame, a driving shaft journaled thereon, an eccentric carried on said shaft, a gear journaled on said eccentric, a latching member carried by said gear and movable into engagement with said eccentric and into a radially extending position, and means for maintaining said latch in one of said positions.

15. In a combination, a frame, a driving shaft journaled thereon, an eccentric carried on said shaft, a pinion journaled on said eccentric, a latching member carried by said pinion and movable into engagement with said eccentric and into a radially extending position, and means carried on said pinion for maintaining said latch in each of its positions.

16. In combination, a frame, a driving shaft journaled thereon, an eccentric carried on said shaft, a gear journaled on said eccentric, a latching member carried by said gear and movable into engagement with said eccentric and into a radially extending position, and a spring pressed plunger engageable with said latch when in either of its positions.

17. In combination, a drill frame, a driving shaft journaled thereon, a feed shaft journaled thereon, a rock shaft journaled thereon, a crank on said rock shaft, speed changing mechanism carried on said driving shaft and connected to said feed shaft, and means independent of said mechanism whereby said feed shaft is disconnected from the drive shaft when said rock shaft is rotated.

18. In combination, a grain drill frame, a drive shaft journaled thereon, feeding mechanism, operative connections between the same and said drive shaft including a change speed mechanism, a rock shaft journaled on said frame, clutch mechanism on said shaft, and means independent of said speed changing mechanism operatively connected between said rock shaft and said clutch mechanism whereby said feed shaft is disconnected from the drive shaft when said rock shaft is rotated.

19. In combination, a grain drill frame, a drive shaft journaled thereon, a feed shaft journaled thereon, driving connections between said shafts including a sleeved sprocket member carried on said shaft, and a coöperating encompassing sprocket member reciprocable with respect to the sleeve portion of said sprocket and carried thereon movable into position to inclose said first mentioned sprocket member.

20. In combination, a grain drill frame, a drive shaft journaled thereon, a feed shaft journaled thereon, driving connections between said shafts including a sleeved sprocket member carried on said shaft, a coöperating encompassing sprocket member reciprocable with respect to the sleeve portion of said sprocket and carried thereon movable into position to inclose said first mentioned sprocket member, and resilient means resisting a longitudinal movement of said first mentioned sprocket relative to said shaft.

21. In a grain drill, in combination, a feed shaft, a driving shaft, power transmitting mechanism connecting said driving shaft with said feed shaft including an eccentric sleeve secured to said driving shaft, an internal gear wheel journaled upon said driving shaft, a pinion journaled upon said eccentric sleeve and engaging with said gear wheel, and means for locking said pinion with said sleeve or releasing it therefrom.

22. In a grain drill, in combination, a feed shaft, a driving shaft, power transmitting mechanism connecting said driving shaft with said feed shaft including a differential gear mechanism, said gear mechanism including an eccentric sleeve secured to said driving shaft and including a notched flange, an internal gear wheel journaled upon said driving shaft, a pinion journaled upon said eccentric sleeve and engaging with said gear wheel, and a latch carried by said pinion and adapted to engage with the notched flange upon said eccentric sleeve.

23. In a grain drill, in combination, a feed shaft, a driving shaft, power transmitting mechanism connecting said driving shaft with said feed shaft including a differential gear mechanism, said gear mechanism including an eccentric sleeve secured to said driving shaft and including a notched flange, an internal gear wheel journaled upon said driving shaft, a pinion journaled upon said eccentric sleeve and engaging with said gear wheel, a latch member carried by said pinion and adapted to engage with the notched flange upon said eccentric sleeve, said latch member being provided with a socket, and a spring-pressed rod carried by a fixed part of the machine and adapted to engage with said socket when said latch is released from said eccentric sleeve.

24. In a grain drill, in combination, a feed shaft, a driving shaft, a gear member secured to said feed shaft, a gear member slidably journaled upon said driving axle and operatively connected with the gear member secured to said feed shaft and provided with a clutch part, a differential gear mechanism carried by said driving shaft and including an eccentric sleeve secured to said driving shaft, an internal gear wheel journaled upon said driving shaft and provided with a clutch part adapted to engage with said first mentioned clutch part, a pinion journaled upon said eccentric sleeve and engaging with said gear wheel, and means for locking said pinion with said sleeve or releasing it therefrom.

25. In a grain drill, in combination, a feed shaft, a driving shaft, a gear member secured to said feed shaft, a spring-pressed gear member slidably journaled upon said driving shaft and operatively connected with the gear member secured to said feed shaft and provided with a clutch part having a flanged head, a differential gear mechanism carried by said driving shaft and including an eccentric sleeve secured to said driving shaft, an internal gear wheel journaled upon said driving shaft and provided with a clutch part adapted to engage with said first mentioned clutch part and having a flanged head, a pinion journaled upon said eccentric sleeve and engaging with said gear wheel, means for locking said pinion with said sleeve or releasing it therefrom, and a sliding cam forked member interposed between said flanged heads and adapted to disengage said clutch parts.

In testimony whereof I affix my signature, in the presence of two witnesses.

CHARLES W. ROBINSON.

Witnesses:
F. D. OVIATT,
E. W. BURGESS.

Copies of this patent may be obtained for five cents each, by addressing the "Commissioner of Patents, Washington, D. C."